US012348941B2

(12) United States Patent
Yamamoto

(10) Patent No.: US 12,348,941 B2
(45) Date of Patent: Jul. 1, 2025

(54) EARPHONE AND FIT ADJUSTMENT METHOD

(71) Applicant: PANASONIC INTELLECTUAL PROPERTY MANAGEMENT CO., LTD., Osaka (JP)

(72) Inventor: Masami Yamamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 197 days.

(21) Appl. No.: 18/255,777

(22) PCT Filed: Sep. 27, 2021

(86) PCT No.: PCT/JP2021/035427
§ 371 (c)(1),
(2) Date: Jun. 2, 2023

(87) PCT Pub. No.: WO2022/118526
PCT Pub. Date: Jun. 9, 2022

(65) Prior Publication Data

US 2024/0205600 A1 Jun. 20, 2024

(30) Foreign Application Priority Data

Dec. 4, 2020 (JP) ................................ 2020-202151

(51) Int. Cl.
*H04R 29/00* (2006.01)
*H04R 1/10* (2006.01)
*H04R 3/04* (2006.01)

(52) U.S. Cl.
CPC ............ *H04R 3/04* (2013.01); *H04R 1/1016* (2013.01); *H04R 2420/07* (2013.01); *H04R 2430/01* (2013.01); *H04R 2460/15* (2013.01)

(58) Field of Classification Search
CPC ................................ H04R 3/04; H04R 1/1016
See application file for complete search history.

(56) References Cited

U.S. PATENT DOCUMENTS 10,511,901 B2 * 12/2019 Garrett ................ H04R 1/1041
2009/0296980 A1 * 12/2009 Yi .......................... G06T 7/579
382/100

(Continued)

FOREIGN PATENT DOCUMENTS

EP 2487930 B1 5/2013
JP 2018531544 A 10/2018
JP 2019523581 A 8/2019

OTHER PUBLICATIONS

International Search Report, mailed Dec. 21, 2021, for International Patent Application No. PCT/JP2021/035427. (5 pages) (with English Translation).

(Continued)

*Primary Examiner* — Simon King
(74) *Attorney, Agent, or Firm* — Seed IP Law Group LLP

(57) ABSTRACT

An earphone includes a sound emitting unit that is connected to a replaceable earpiece inserted into an auricle of a user and having a plurality of sizes and emits a sweep signal reproduced by a terminal through the earpiece, a sensor configured to acquire, based on the sweep signal, parameters in three axial directions including an upper-lower direction, a front-rear direction, and a left-right direction of the user, a determination unit configured to determine whether a size of the earpiece is replaced or an insertion position of the earpiece in the auricle is adjusted based on an acquisition result of each of the parameters in the three axial directions, and a presentation unit configured to output a determination result of presence or absence of the replacement or the adjustment to the terminal.

11 Claims, 5 Drawing Sheets

(56) References Cited

U.S. PATENT DOCUMENTS

| | | | | |
|---|---|---|---|---|
| 2015/0181325 | A1 | 6/2015 | Urup et al. | |
| 2017/0070834 | A1 | 3/2017 | Ben-Ami et al. | |
| 2017/0085988 | A1 | 3/2017 | Hardi et al. | |
| 2017/0094401 | A1 | 3/2017 | Ben-Ami et al. | |
| 2017/0347180 | A1 | 11/2017 | Petrank | |
| 2018/0376232 | A1 | 12/2018 | Hardi et al. | |
| 2018/0376234 | A1 | 12/2018 | Petrank | |
| 2018/0376267 | A1 | 12/2018 | Ben-Ami et al. | |
| 2019/0215640 | A1* | 7/2019 | Murata | H04R 3/04 |
| 2019/0273982 | A1 | 9/2019 | Petrank | |
| 2020/0162808 | A1* | 5/2020 | Monsarrat-Chanon | H04R 1/1083 |
| 2020/0275187 | A1 | 8/2020 | Petrank | |
| 2020/0314518 | A1* | 10/2020 | Hatfield | H04R 1/1041 |
| 2021/0127194 | A1 | 4/2021 | Hardi et al. | |
| 2021/0400408 | A1* | 12/2021 | Khenkin | H04R 25/30 |

OTHER PUBLICATIONS

Extended European Search Report dated Apr. 10, 2024, for the corresponding International Patent Application No. 21900282.1, 7 pages.

* cited by examiner

EARPHONE AND FIT ADJUSTMENT METHOD

TECHNICAL FIELD

The present disclosure relates to earphones and a method of adjusting a feeling of wearing.

BACKGROUND ART

In recent years, with spread of smartphones, use of small inner earphones is becoming mainstream. The inner earphones are required to implement a more comfortable listening environment.

In relation to such earphones in the related art, Patent Literature 1 discloses an audio headset including a speaker, an ear cushion adapter, a microprocessor, a driver, and a replaceable ear cup that can be removed from a headset earpiece. The microprocessor recognizes the replaceable ear cup that can be removed, and adjusts audio output via the speaker based on a parameter related to the replaceable ear cup that can be removed.

CITATION LIST

Patent Literature

Patent Literature 1: JP-A-2018-531544

SUMMARY OF INVENTION

Technical Problem

In a configuration of Patent Literature 1, only adjustment of the audio output based on a fixed parameter determined for each of selected ear cups for replacement can be performed. However, since sizes of ears and heads vary among individuals in users who wear inner earphones, there is a possibility that uniform audio output adjustment as in Patent Literature 1 is insufficient. Therefore, the configuration of Patent Literature 1 has room for improvement in order to implement a more comfortable listening environment for the user.

The present disclosure provides earphones and a method of adjusting a feeling of wearing capable of assisting improvement of a feeling of wearing of a user by presenting replacement with an appropriate earpiece or position adjustment, or correcting audio output at the time of wearing to an appropriate frequency characteristic.

Solution to Problem

The present disclosure provides earphones to be worn by a user, and the earphones includes: a sound emitting unit that is connected to a replaceable earpiece inserted into an auricle of a user and having a plurality of sizes and emits a sweep signal reproduced by a terminal through the earpiece; a sensor configured to acquire, based on the sweep signal, parameters in three axial directions including an upper-lower direction, a front-rear direction, and a left-right direction of the user; a determination unit configured to determine whether a size of the earpiece is replaced or an insertion position of the earpiece in the auricle is adjusted based on an acquisition result of each of the parameters in the three axial directions; and a presentation unit configured to output a determination result of presence or absence of the replacement or the adjustment to the terminal.

In addition, the present disclosure provides a method of adjusting a feeling of wearing executed by earphones to be worn by a user, and the method of adjusting a feeling of wearing includes: emitting a sweep signal reproduced by a terminal through a replaceable earpiece inserted into an auricle of the user and having a plurality of sizes; acquiring, based on the sweep signal, parameters in three axial directions including an upper-lower direction, a front-rear direction, and a left-right direction of the user; determining whether a size of the earpiece is replaced or an insertion position of the earpiece in the auricle is adjusted based on an acquisition result of each of the parameters in the three axial directions; and outputting a determination result of presence or absence of the replacement or the adjustment to the terminal.

Advantageous Effects of Invention

According to the present disclosure, it is possible to assist improvement of a feeling of wearing of the user by presenting replacement with an appropriate earpiece or position adjustment, or correcting audio output at the time of wearing to an appropriate frequency characteristic.

DESCRIPTION OF EMBODIMENTS

Figure 1:
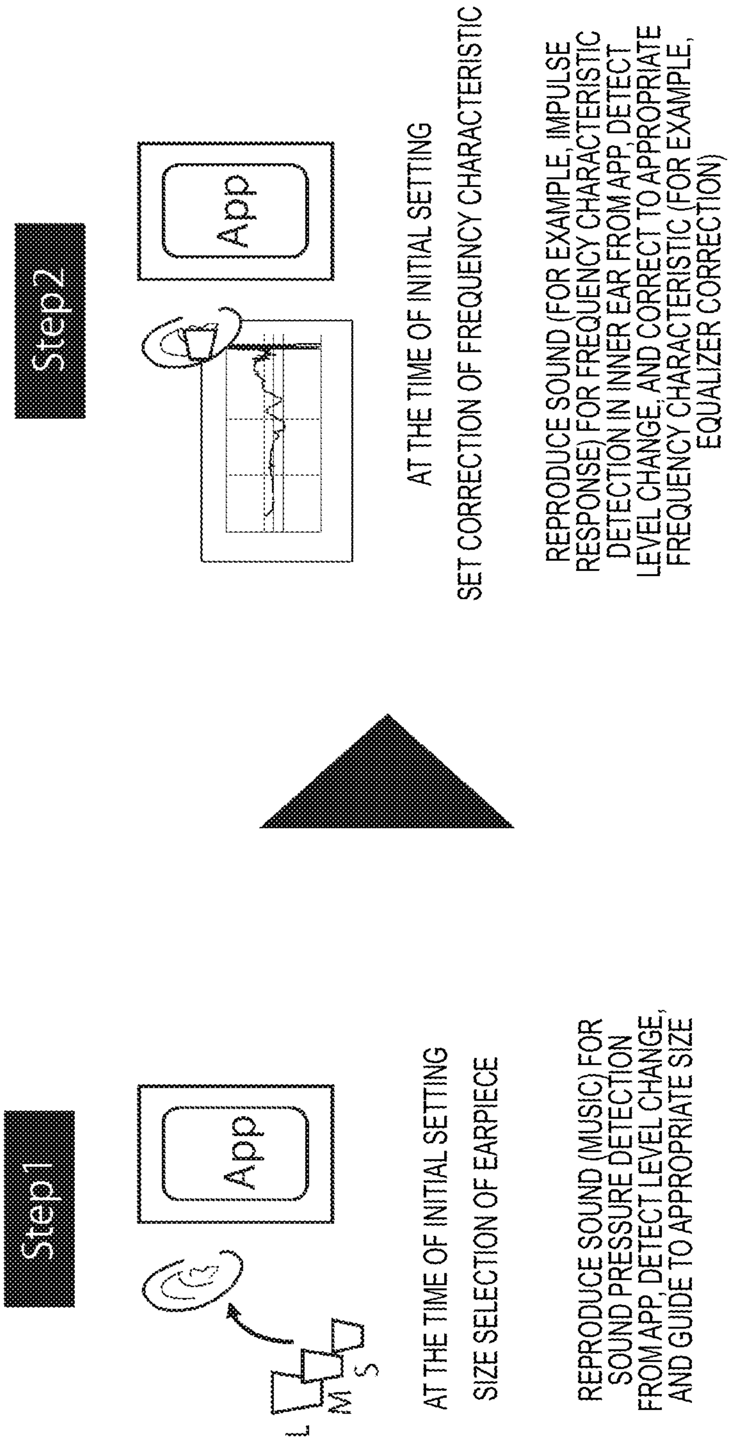
FIG. 1 is a schematic diagram showing an overview of a first embodiment.

Hereinafter, an embodiment specifically disclosing earphones and a method of adjusting a feeling of wearing according to the present disclosure will be described in detail with reference to the drawings as appropriate. However, unnecessarily detailed description may be omitted. For example, detailed description of a well-known matter or repeated description of substantially the same configuration may be omitted. This is to avoid unnecessary redundancy in following description and to facilitate understanding for those skilled in the art. In addition, each of the accompanying drawings is referred to in accordance with a direction of the reference sign. The accompanying drawings and the following description are provided for a thorough understanding of the present disclosure for those skilled in the art, and are not intended to limit the subject matter in the claims.

For example, in the present disclosure, complete wireless earphones having a pair of earphone housings and the earphone housings being wirelessly connected to each other is described as an example of the present disclosure, but the present disclosure is not limited thereto. The earphone housings may be connected to each other by wire and may be connected to an external device by wire. That is, regardless of whether communication is wireless or wired, a content of the present disclosure can be appropriately adopted as long as the earpiece that can be attached to the earphones housing has a plurality of sizes and is configured to be replaceable according to a feeling of wearing of a user.

In addition, a "unit" or a "device" in the embodiment is not only limited to a physical configuration that is simply mechanically implemented by hardware, but also includes a situation in which a function of the configuration is implemented by software such as a program. In addition, a function of one configuration may be implemented by two or more physical configurations, or functions of two or more configurations may be implemented by one physical configuration, for example.

First, before the embodiment is specifically described, a background and an overview of the present disclosure will be described with reference to FIG. 1.

BACKGROUND OF PRESENT DISCLOSURE

The background of the present disclosure will be described with reference to FIG. 1. FIG. 1 is a schematic diagram showing an overview of a first embodiment. In recent years, small inner earphones are widely used with spread of smartphones, but hobbies and tastes for music are diversified, and the inner earphones are also required to implement a listening environment suitable for each individual. Such an individual listening environment is also referred to as "personal sound", for example.

It is understood that there are various problems in implementing the personal sound. For example, such problems include a point that a definition of the personal sound is unclear, a point that accuracy of measurement is not obtained, a point that the user is less likely to be satisfied after the adjustment, and the like.

As a specific example, with respect to one of existing products that seek to implement the personal sound, it is rare for each user to be able to recognize a difference in hearing, and there is a possibility that measurement results vary when the number of measurement points is small with respect to output sound. Further, there are few cases where the user can make priority determination and be satisfied based on preference of sound.

Thus, although a product that seeks to implement the personal sound appears, it cannot be said that rational and satisfying personal sound can be implemented, and there is room for improvement.

As a result of intensive studies for further improvement of the personal sound, the present inventors set following three targets of the first embodiment according to the present disclosure.

(1) Improve a feeling of wearing of an ear of the user related to a size and a wearing position of an earpiece of earphones.

(2) Detect a contact influence on the ear (for example, the wearing position or the like) that cannot be detected in a leakage compensation.

(3) Mainly adjust a low range having the contact influence on the ear because a middle range and a high range of sound tend to be influenced by the preference of sound of the user.

Therefore, the present inventors focus on a sensor (for example, an acceleration sensor or the like) capable of acquiring parameters in three axial directions including an upper-lower direction, a front-rear direction, and a left-right direction of the user. Then, with this focus, the present inventors find a configuration in which the personal sound including the sensor can be implemented as described later. In the present disclosure, the acceleration sensor is taken as an example of the sensor, but the present disclosure is not limited thereto.

As shown in FIG. 1, in the present disclosure, adjustment of the personal sound is performed in two steps (a first processing routine and a second processing routine to be described later) using such a configuration.

In step 1, as the leakage compensation, a sensor acquires a change in a sound pressure at the time of wearing and at all times, and size selection of the earpiece or deviation of the wearing position is detected by the acquisition. For example, the earphones are connected to an external device such as the smartphone so as to be capable of wireless communication, and an application (App) is installed in the external device. At the time of initial setting of the earphones, the leakage compensation is performed in the earphones in accordance with audio reproduction from the application of the external device to determine the earpiece having an optimum size.

Specifically, the user wears a freely selected earpiece, and in this worn state, the application of the external device and the earphones reproduce sound (for example, music or the sweep signal) for sound pressure detection in an acoustic space including an ear canal through a driver of the earphones. The sensor of the earphones acquires a level change. An optimum size of the earpiece is determined based on an acquisition result. The application and the earphones display a determined size on, for example, a display unit of the external device to prompt the user to select the size of the earpiece and attach the selected earpiece.

Step 2 is performed after step 1. In step 2, after the size of the earpiece is determined, detection and correction in the worn state are performed by the sensor. For example, frequency specification is corrected for an audio signal output from the application (App) of the external device. Specifically, in a state in which the user wears the earphones selected in step 1, the application of the external device reproduces sound (for example, a sweep signal or an impulse signal) for frequency characteristic detection in the acoustic space including the ear canal, and the sensor of the earphones acquires the level change. Based on an acquisition result, the application and the earphones perform correction so as to have appropriate frequency characteristics (for example, equalizer correction).

Thus, in the present disclosure, it is possible to assist improvement of the feeling of wearing of the user by presenting replacement with an appropriate earpiece or position adjustment, or correcting audio output at the time of wearing to an appropriate frequency characteristic.

FIRST EMBODIMENT

The first embodiment according to the present disclosure will be described with reference to FIGS. 2 to 5.

[Hardware Configuration of Earphones]

Figure 2:
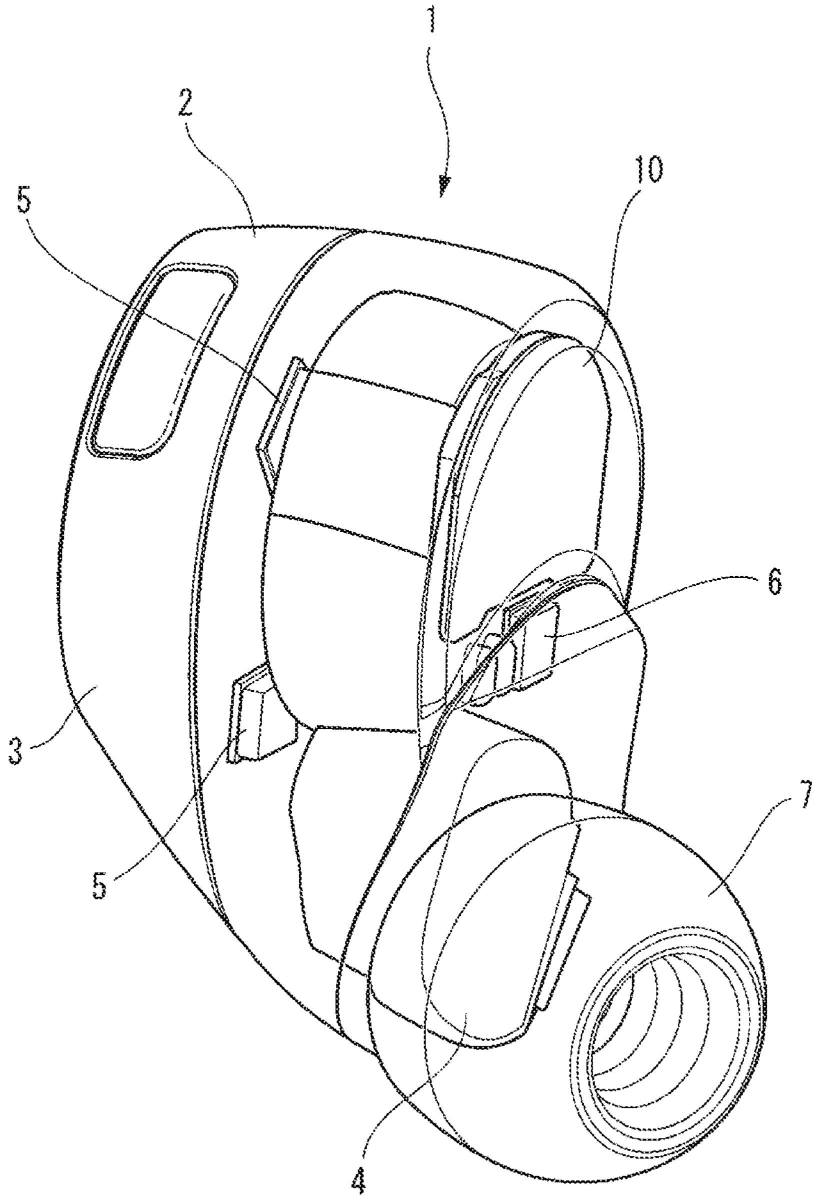
FIG. 2 is a perspective view showing a hardware configuration of earphones according to the first embodiment.

The hardware configuration of earphones 1 according to the present embodiment will be described with reference to FIG. 2. FIG. 2 is a perspective view showing the hardware configuration of the earphones 1 according to the first embodiment.

As shown in FIG. 2, each of the earphones 1 is an inner acoustic device worn on an ear of a user and used, and includes a pair of earphone housings 2 and earpieces 7 attached to the earphone housings 2. The earphone housing 2 is held in a state of being inserted into an ear canal by the earpiece 7 with respect to the ear of the user, and a held state is a use state of the earphones 1.

In the present embodiment, the earphones 1 include a wireless communication unit 13 that can perform communication according to a communication standard of Bluetooth (registered trademark). The earphones 1 are an example of an acoustic device that is wirelessly connected to a sound source device such as a radio device or a music reproduction device as a music reproduction application or a telephone device such as a smartphone P as a telephone application via the wireless communication unit 13. Then, the earphones 1 receive an audio signal, a music signal, and the like transmitted from these devices, and outputs the audio signal as a sound wave, or picks up utterance of the user and transmits a sound pick-up result to these devices.

In the present embodiment, the smartphone P is described as an example of a device with which the earphones 1 perform wireless communication, but the present invention is not limited thereto, and the earphones 1 can be connected to various devices as long as the wireless communication is possible. For convenience of explanation, only one of the pair of earphone housings 2 is shown in FIG. 1.

Each of the earphone housings 2 has a housing 3 as a structural member, and is formed in a box shape having a rounded outer appearance. The housing 3 is provided with a composite of materials such as synthetic resin, metal, and ceramic, and a storage space is formed inside the housing 3. In addition, the housing 3 is provided with an attachment cylindrical portion communicating with the storage space.

The earpiece 7 is made of a flexible member such as silicon, and is injection-molded with an inner cylindrical portion and an outer cylindrical portion. The earpiece 7 is inserted and fixed to the attachment cylindrical portion of the housing 3 at the inner cylindrical portion of the earpiece 7, and is replaceable (detachable) with respect to the attachment cylindrical portion of the housing 3. The earpiece 7 is attached to the ear canal of the user at the outer cylindrical portion of the earpiece 7, and is elastically deformed according to a shape of the ear canal to be attached. With this elastic deformation, the earpiece 7 is held in the ear canal of the user. In addition, a plurality of sizes are prepared for the earpiece 7, and the size of the earpiece 7 is appropriately replaced in accordance with the shape of the ear canal of the user or the like.

Each of the earphone housings 2 includes a driver 4 (an example of a sound emitting unit), a plurality of microphones 5, an acceleration sensor 6 (an example of a sensor), and a drive control circuit 10 as electric and electronic members, and these electric and electronic members are stored in the storage space of the housing 3.

The driver 4 is an electronic component called a so-called speaker or the like, and converts an audio signal into a sound wave (vibration of air) and outputs the sound wave. Specifically, the driver 4 includes a diaphragm, and converts the audio signal into the sound wave by vibrating the diaphragm based on the audio signal input to the driver 4. The sound wave output from the driver 4 propagates to an eardrum of the ear of the user through a cavity of the earpiece 7. In the present embodiment, the driver 4 emits an audio signal (for example, a sweep signal) reproduced by the smartphone P of the user via the earpiece 7.

The plurality of microphones 5 are disposed in the earphone housing 2 so as to be able to pick up sound in an acoustic space including a surrounding of the user, the utterance of the user, and the ear canal in a state where the earphones 1 are attached to an auricle.

In the worn state of the earphones 1, the acceleration sensor 6 detects parameters and frequency characteristics of signals of the parameters for each component in the three axial directions including the upper-lower direction (vertical direction according to gravity, and hereinafter, also referred to as a "Z-axis direction"), the front-rear direction (hereinafter, also referred to as an "X-axis direction"), and the left-right direction (hereinafter, also referred to as a "Y-axis direction") of the user. A detection result is transmitted to the drive control circuit 10.

The drive control circuit 10 has a plurality of drive circuits and control circuits, and operates as a minicomputer of the earphones 1 that appropriately performs signal processing and drive control.

[Configuration of Drive Control Circuit]

Figure 3:
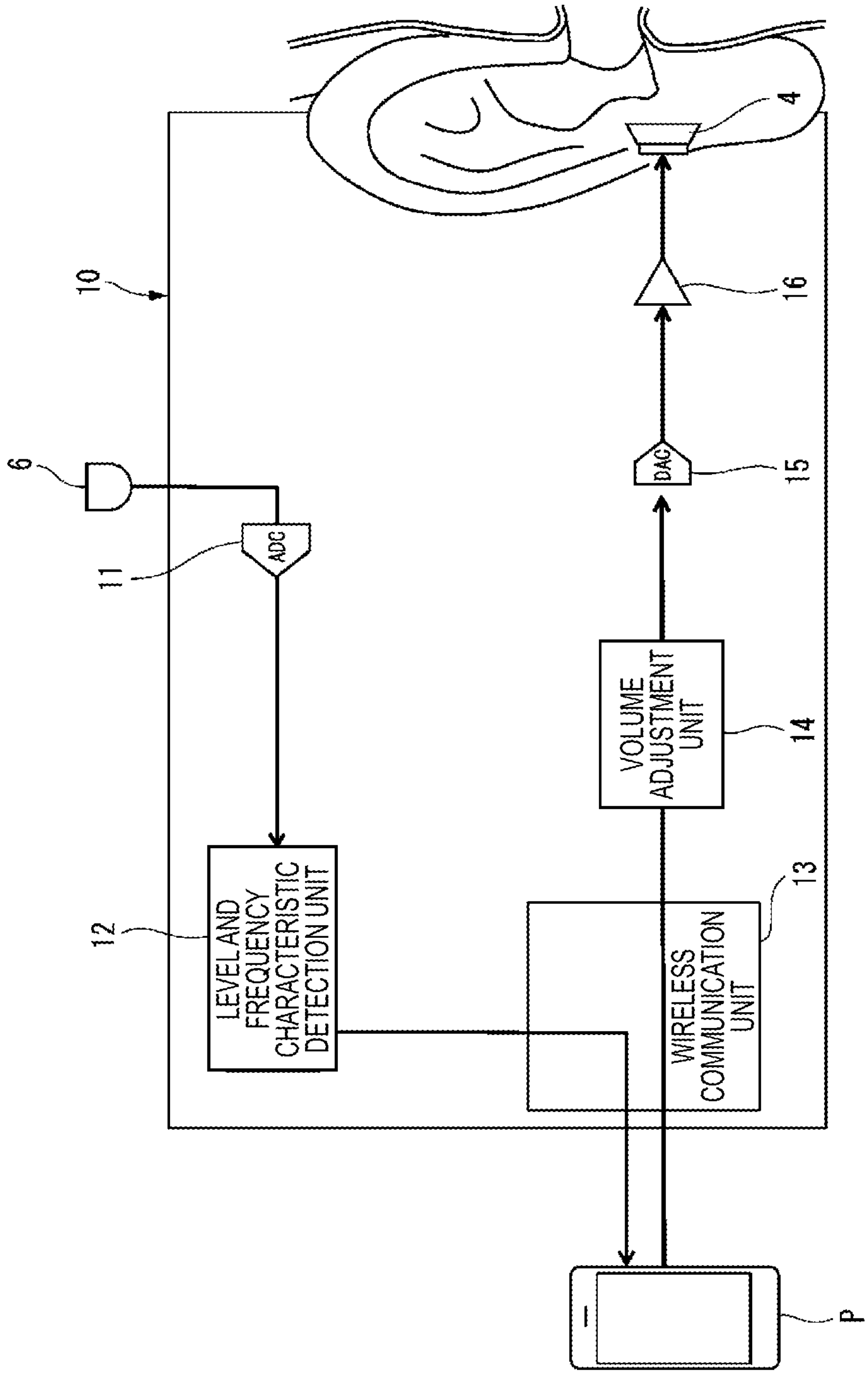
FIG. 3 is a functional block diagram showing a drive control circuit shown in FIG. 2.

Next, a configuration of the drive control circuit 10 will be described with reference to FIG. 3. FIG. 3 is a functional block diagram showing the drive control circuit 10 shown in FIG. 2.

The drive control circuit 10 is formed as a general-purpose computer as described above, and further includes a storage device, an arithmetic device, and the like. In the drive control circuit 10, a program as software stored and held in the storage device is executed by arithmetic device. In the present embodiment, a specialized device (dedicated circuit) is mounted on a substrate of the drive control circuit 10. That is, each block shown inside the drive control circuit 10 shown in FIG. 3 represents a function implemented by software such as a program or a function implemented by hardware such as a dedicated device.

In addition, in the present embodiment, a function implemented by the drive control circuit 10 is implemented by both software and hardware, but the present invention is not limited thereto. For example, all functions thereof may be configured with hardware of the "device".

In addition, as will be described later, the drive control circuit 10 is equipped with the wireless communication unit 13. In the present embodiment, the drive control circuit 10 is wirelessly connected to the smartphone P of the user via the wireless communication unit 13. The smartphone P of the user has a display unit, and an application is installed in the smartphone P. The application initially sets up the earphones 1 and corrects a volume level and a frequency characteristic of the audio signal to be transmitted to the wireless communication unit 13 (for example, equalizer correction).

The drive control circuit 10 includes an analog-to-digital conversion unit 11, a level and frequency characteristic detection unit 12, the wireless communication unit 13, a volume adjustment unit 14, a digital-to-analog conversion unit 15, and an amplifier unit 16.

The analog-to-digital conversion unit 11 is electrically connected to the acceleration sensor 6, and converts an electrical signal output from the acceleration sensor 6 into a digital signal. The analog-to-digital conversion unit 11 transmits the digital signal to the level and frequency characteristic detection unit 12.

Based on a detection result of the acceleration sensor 6, the level and frequency characteristic detection unit 12 detects the volume (sound pressure) level and the frequency characteristic of each component in the X-axis direction, the Y-axis direction, and the Z-axis direction as parameters for each component. Further, in the first processing routine to be described later, the level and frequency characteristic detection unit 12 determines whether the size of the earpiece 7 is replaced or whether an insertion position of the earpiece 7 in the auricle is adjusted based on the detection result of the parameter. In addition, in the second processing routine to be described later, the level and frequency characteristic detection unit 12 determines whether the insertion position of the earpiece 7 in the auricle is adjusted or a volume level of the sweep signal is increased or decreased based on an acquisition result of a frequency characteristic of a signal of each of the parameters in the three axial directions. The level and frequency characteristic detection unit 12 transmits a determination result to the wireless communication unit 13.

The wireless communication unit 13 is a device for performing wireless communication with the smartphone P of the user. The wireless communication unit 13 outputs the determination result of the level and frequency characteristic detection unit 12 to the smartphone P of the user. In addition, the audio signal such as the sweep signal reproduced by the smartphone P is transmitted to the wireless communication unit 13 as the digital signal, and the wireless communication unit 13 transmits the transmitted audio signal to the volume adjustment unit 14.

In the present embodiment, the wireless communication unit 13 of the earphones 1 performs communication according to the communication standard of Bluetooth (registered trademark), but the present invention is not limited thereto, and the wireless communication unit 13 may be connectable to a communication line such as Wi-Fi (registered trademark) or a mobile communication line. In addition, the communication is not limited to the wireless communication, and may be wired communication.

The volume adjustment unit 14 receives the audio signal such as the sweep signal reproduced by the smartphone P via the wireless communication unit 13, adjusts the volume level of the audio signal, and transmits the audio signal to the digital-to-analog conversion unit 15.

The digital-to-analog conversion unit 15 converts the audio signal transmitted from the volume adjustment unit 14 into an analog signal, and outputs the converted analog signal to the amplifier unit 16.

The amplifier unit 16 is electrically connected to the driver 4, amplifies the analog signal output from the digital-to-analog conversion unit 15, and outputs the amplified analog signal to the driver 4. The driver 4 outputs an audio signal as a physical air vibration (sound wave) based on input.

[First Processing Routine in Drive Control Circuit]

Figure 4:
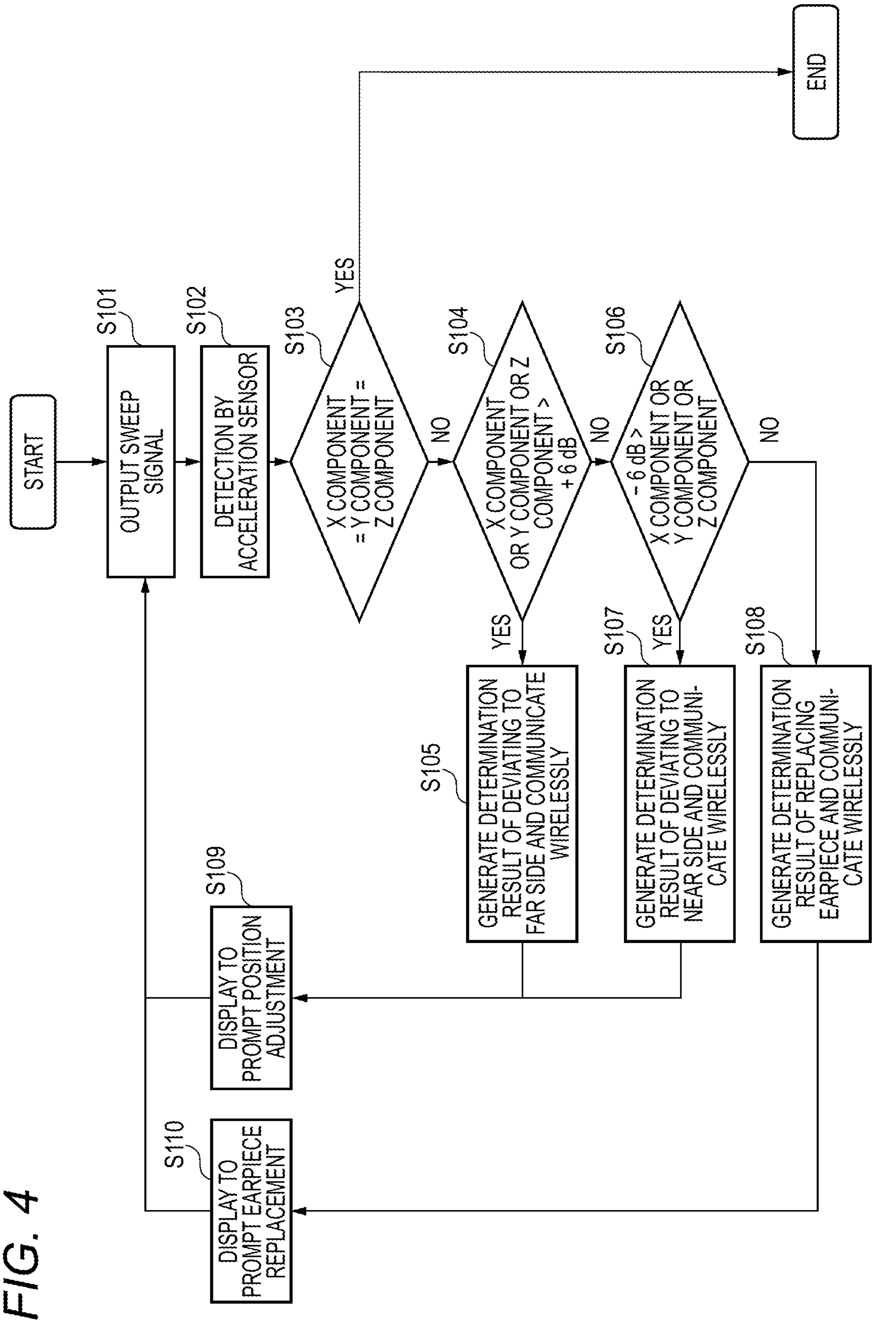
FIG. 4 is a flowchart showing a first processing routine in the drive control circuit shown in FIG. 3.

Next, the first processing routine in the drive control circuit 10 according to the present embodiment will be described with reference to FIG. 4. FIG. 4 is a flowchart showing the first processing routine in the drive control circuit 10 shown in FIG. 3.

The first processing routine and the second processing routine described later are routines that are executed as initial settings before the earphones 1 are actually started to be used. The first processing routine and the second processing routine are executed as a set (one set) of routines at the time of the initial setting, and the first processing routine is executed before the second processing routine (see FIG. 1). That is, in the present embodiment, the initial setting is performed in two stages, which are the first processing routine and the second processing routine.

As shown in FIG. 4, in the first processing routine, the driver 4 outputs a sweep signal reproduced by the smartphone P of the user as the sound wave in a state in which the earphones 1 are worn by the user (S101). A frequency band of the sweep signal at this time is set to, for example, 20 Hz to 500 Hz (an example of a low frequency band), but is not limited to a frequency within this range. Due to output of the sweep signal, the sound wave propagates to the acoustic space including the ear canal of the user. In this propagated state, the acceleration sensor 6 detects parameters in the X-axis direction, the Y-axis direction, and the Z-axis direction as components in the respective directions (S102).

The level and frequency characteristic detection unit 12 acquires a detection result of the acceleration sensor 6, and determines whether all detected parameters of the three axes are the same (S103). When it is determined that all parameters are the same in the determination result, the first processing routine ends because adjustment is not necessary (END).

When it is determined that the parameters are not the same (NO in S103), the level and frequency characteristic detection unit 12 determines whether any one of the parameters of the components in the three axial directions, that is, the X-axis direction, the Y-axis direction, and the Z-axis direction is greater than the remaining two parameters by a value greater than +6 dB (an example of a first predetermined value) (S104, (X or Y or Z>+6 dB)).

When it is determined to be larger than +6 dB (YES in S104), the level and frequency characteristic detection unit 12 generates, as the determination result, a warning indicating that the earpiece 7 is pushed into a far side of the auricle. The level and frequency characteristic detection unit 12 transmits the generated determination result to the wireless communication unit 13 (S105). The wireless communication unit 13 transmits the determination result to the smartphone P of the user, and the smartphone P displays the determination result on the display unit to prompt the user to perform position adjustment (S109).

On the other hand, when it is determined to be smaller than +6 dB (NO in S104), the level and frequency characteristic detection unit 12 determines whether any one of the parameters in the three axial directions is greater than the remaining two parameters by a value greater than −6 dB (an example of a second predetermined value) in a negative direction (S106, (X or Y or Z<−6 dB)).

When it is determined to be larger than −6 dB in the negative direction (YES in S106), that is, when it is determined that any one of the parameters in the three axial directions is smaller than +6 dB and smaller than −6 dB in the negative direction (in other words, larger than −6 dB) than the remaining two parameters through steps S104 and S106, the level and frequency characteristic detection unit 12 generates a warning indicating that the earpiece 7 is positioned on a near side in the auricle as the determination result. The level and frequency characteristic detection unit 12 transmits the generated determination result to the wireless communication unit 13 (S107). The wireless communication unit 13 transmits the determination result to the smartphone P of the user, and the smartphone P displays the determination result on the display unit to prompt the user to perform position adjustment (S109).

On the other hand, when it is determined to be smaller than −6 dB in the negative direction (NO in S106), that is, when it is determined that any one of the parameters in the three axial directions is smaller than +6 dB and larger than −6 dB in the negative direction (in other words, smaller than −6 dB) than the remaining two parameters, the level and frequency characteristic detection unit 12 generates a warning indicating that the size of the earpiece 7 is not suitable as the determination result. The level and frequency characteristic detection unit 12 transmits the generated determination result to the wireless communication unit 13 (S108). The wireless communication unit 13 transmits the determination result to the smartphone P of the user, and the smartphone P displays the determination result on the display unit to prompt replacement of the size of the earpiece 7 (S110).

Thus, in the first processing routine, the level and frequency characteristic detection unit 12 determines whether the size of the earpiece 7 is replaced or whether the insertion position of the earpiece 7 in the auricle is adjusted, based on the acquisition result of each of the parameters in the three axial directions. Therefore, at the time of the initial setting of the earpiece 7, it is possible to assist the improvement of the feeling of wearing of the user by presenting replacement with an appropriate earpiece 7 or position adjustment.

[Second Processing Routine in Drive Control Circuit]

Figure 5:
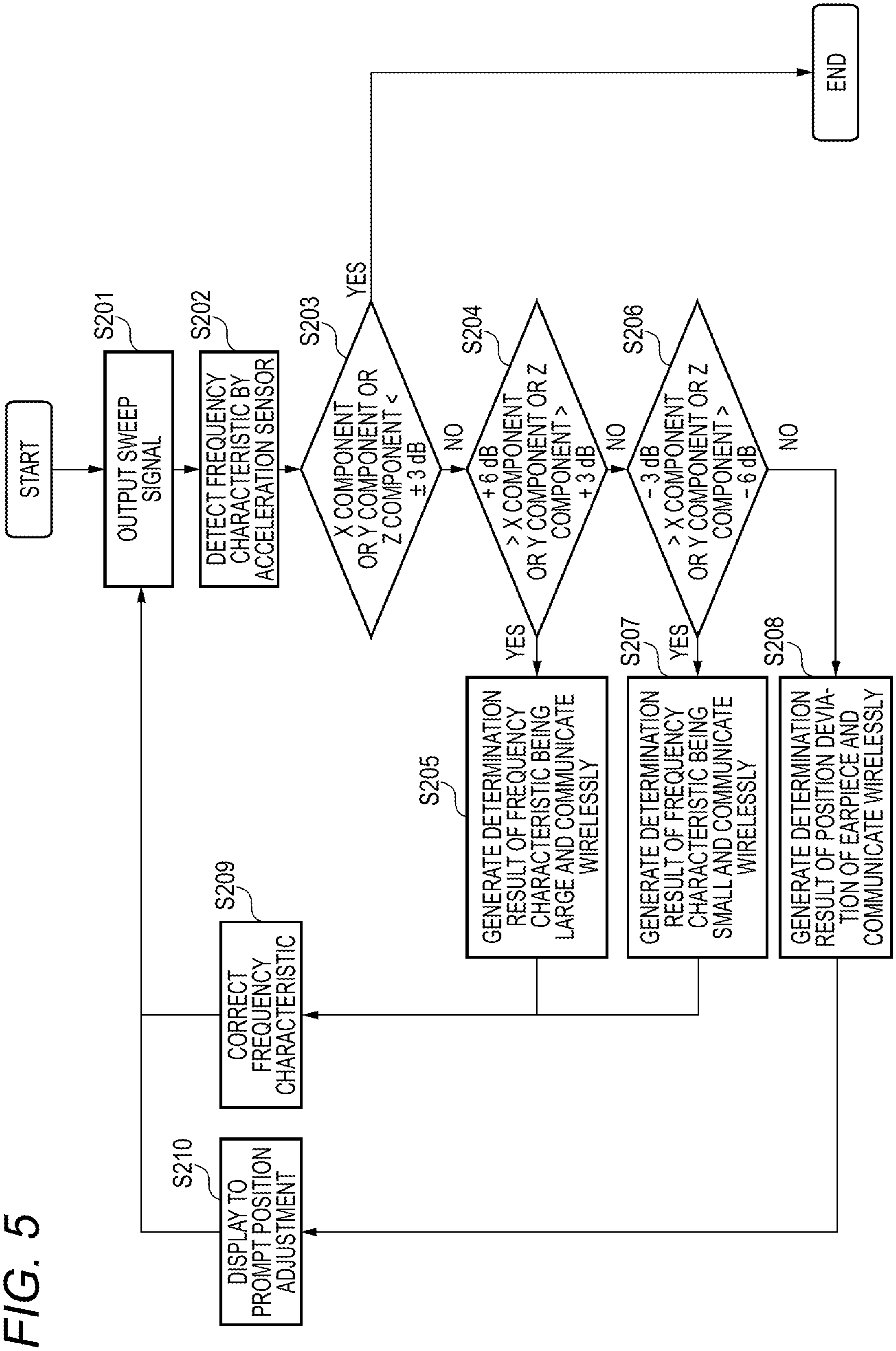
FIG. 5 is a flowchart showing a second processing routine in the drive control circuit shown in FIG. 3.

Next, the second processing routine in the drive control circuit 10 according to the present embodiment will be described with reference to FIG. 5. FIG. 5 is a flowchart showing the second processing routine in the drive control circuit 10 shown in FIG. 3. As described above, the second processing routine is executed after the first processing routine is completed (see FIG. 1).

As shown in FIG. 5, in the second processing routine, the driver 4 outputs a sweep signal reproduced by the smartphone P of the user as the sound wave in a state in which the earphones 1 are worn by the user (S201). The frequency band of the sweep signal at this time is set to, for example, 20 Hz to 2 kHz (an example of a high frequency band), but is not limited to a frequency within this range. Due to output of the sweep signal, the sound wave propagates to the acoustic space including the ear canal of the user. In this propagated state, the acceleration sensor 6 detects a frequency characteristic of a signal of each of the parameters in the X-axis direction, the Y-axis direction, and the Z-axis direction as components in the respective directions (S202).

The level and frequency characteristic detection unit 12 acquires the detection result of the acceleration sensor 6, and determines whether any one of the frequency characteristics of signals of each parameter is within a predetermined range, for example, within ±3 dB with respect to each of the detected parameters of the three axial directions, that is, the X-axis direction component, the Y-axis direction component, and the Z-axis direction component (S203). When it is determined to be within the predetermined range in the determination result, the second processing routine ends because adjustment is not necessary (END).

When it is determined to be not within the predetermined range (NO in S203), the level and frequency characteristic detection unit 12 determines whether the frequency characteristic of the signal of any one of the parameters in the three axial directions is within a range of +3 dB to +6 dB from the frequency characteristics of the signals of the remaining two parameters (S204).

When it is determined to be within the range of +3 dB to +6 dB (YES in S204) in the determination result, the level and frequency characteristic detection unit 12 generates a warning indicating that the volume level of the sweep signal output from the driver 4 is larger than a desired value as the determination result. The level and frequency characteristic detection unit 12 transmits the generated determination result to the wireless communication unit 13 (S205). The wireless communication unit 13 transmits the determination result to the smartphone P of the user, and the smartphone P corrects the volume level and the frequency characteristic of the audio signal such as the sweep signal in accordance with the determination result so that the sweep signal becomes smaller than a current state. The smartphone P transmits the corrected audio signal to the volume adjustment unit 14 through the wireless communication unit 13 (S209).

On the other hand, when it is determined to be within the range of +3 dB to +6 dB (NO in S204), the level and frequency characteristic detection unit 12 determines whether the frequency characteristic of the signal of any one of the parameters in the three axial directions is within a range of −3 dB to −6 dB from the frequency characteristics of the signals of the remaining two parameters (S206).

When it is determined to be within the range of −3 dB to −6 dB (YES in S206), that is, when it is determined that the frequency characteristic of the signal of any one of the parameters in the three axial direction is larger than −3 dB in the negative direction and smaller than −6 dB in the negative direction than the frequency characteristics of the signals of the remaining two parameters through steps S204 and S206, the level and frequency characteristic detection unit 12 generates a warning indicating that the sound volume level of the sweep signal is smaller than the desired value as the determination result. The level and frequency characteristic detection unit 12 transmits the generated determination result to the wireless communication unit 13 (S207). The wireless communication unit 13 transmits the determination result to the smartphone P of the user, and the smartphone P corrects the volume level and the frequency characteristic of the audio signal such as the sweep signal according to the determination result so that the sweep signal becomes larger than a current state (S209).

On the other hand, when it is determined to be not within the range of −3 dB to −6 dB (NO in S206), that is, when it is determined that the frequency characteristic of the signal of any one of the parameters in the three axial directions is larger than −6 dB in the negative direction than the frequency characteristics of the signals of the remaining two parameters, the level and frequency characteristic detection unit 12 generates a warning indicating that the insertion position of the earpiece 7 in the auricle is deviated as the determination result. The level and frequency characteristic detection unit 12 transmits the generated determination result to the wireless communication unit 13. The wireless communication unit 13 transmits the determination result to the smartphone P of the user (S208). The smartphone P displays the determination result on the display unit to prompt the user to perform position adjustment (S210).

Thus, in the second processing routine, the level and frequency characteristic detection unit 12 determines whether the insertion position of the earpiece 7 in the auricle is adjusted or the volume level of the sweep signal is increased or decreased based on the acquisition result of the frequency characteristic of each parameter in the three axial directions. Therefore, at the time of the initial setting of the earpiece 7, it is possible to assist the improvement of the feeling of wearing of the user by appropriately performing position adjustment of the earpiece 7, or correcting the audio output at the time of wearing to an appropriate frequency characteristic.

As described above, the earphones 1 according to the first embodiment are earphones 1 to be worn by a user. The earphones include the driver 4 (an example of the sound emitting unit) that is connected to the replaceable earpiece 7 inserted into the auricle of the user and having a plurality of sizes and emits the sweep signal reproduced by the smartphone P (an example of a terminal) of the user through the earpiece 7, the acceleration sensor 6 (an example of the sensor) configured to acquire, based on the sweep signal, the parameters in the three axial directions including the upper-lower direction, the front-rear direction, and the left-right direction of the user, the level and frequency characteristic detection unit 12 (an example of a determination unit) configured to determine whether the size of the earpiece 7 is replaced or the insertion position of the earpiece 7 in the auricle is adjusted based on the acquisition result of each of the parameters in the three axial directions, and the wireless communication unit 13 (an example of a presentation unit)

configured to output the determination result of presence or absence of the replacement or the adjustment to the smartphone P.

According to the method of adjusting a feeling of wearing according to the first embodiment, the method of adjusting a feeling of wearing used in a device worn by the user includes: emitting the sweep signal reproduced by the smartphone P (an example of the terminal) of the user through the replaceable earpiece 7 inserted into the auricle of the user and having a plurality of sizes; acquiring, based on the sweep signal, the parameters in the three axial directions including the upper-lower direction, the front-rear direction, and the left-right direction of the user; determining whether the size of the earpiece 7 is replaced or the insertion position of the earpiece 7 in the auricle is adjusted based on the acquisition result of each of the parameters in the three axial directions; and outputting the determination result of presence or absence of the replacement or the adjustment to the terminal.

Accordingly, the earphones 1 determine whether the size of the earpiece 7 is replaced or the insertion position of the earpiece 7 in the auricle is adjusted based on the acquisition result of each of the parameters in the three axial directions, so that at the time of the initial setting of the earpiece 7, it is possible to assist the improvement of the feeling of wearing of the user by presenting replacement with an appropriate earpiece 7 or position adjustment.

In addition, in the earphones 1 according to the first embodiment, the driver 4 (an example of the sound emitting unit) emits the sweep signal having a low frequency band (for example, 20 Hz to 500 Hz). Accordingly, the earphones 1 can more accurately determine whether the size of the earpiece 7 is replaced or whether the insertion position of the earpiece 7 in the auricle is adjusted.

In addition, in the earphones 1 according to the first embodiment, the level and frequency characteristic detection unit 12 (an example of the determination unit) generates, as the determination result, the warning indicating that the earpiece 7 is pushed into the far side of the auricle when the level and frequency characteristic detection unit 12 determines that any one of the parameters in the three axial directions is larger than +6 dB (the first predetermined value) than remaining two parameters. Accordingly, even when the wearing position of the earpiece 7 is too far, the earphones 1 can detect a situation based on a magnitude relationship among the parameters in the three axial directions, and thus can present appropriate position adjustment of the earpiece 7 to the user.

In addition, in the earphones 1 according to the first embodiment, the level and frequency characteristic detection unit 12 (an example of the determination unit) generates, as the determination result, the warning indicating that the earpiece 7 is positioned on the near side in the auricle when the level and frequency characteristic detection unit 12 determines that any one of the parameters in the three axial directions is smaller than +6 dB (an example of the first predetermined value) and larger than −6 dB (an example of the second predetermined value) than remaining two parameters. Accordingly, even when the wearing position of the earpiece 7 is too near, the earphones 1 can detect a situation based on the magnitude relationship among the parameters in the three axial directions, and thus can present appropriate position adjustment of the earpiece 7 to the user.

In addition, in the earphones 1 according to the first embodiment, the level and frequency characteristic detection unit 12 (an example of the determination unit) generates, as the determination result, the warning indicating that the size of the earpiece 7 is not suitable when the level and frequency characteristic detection unit 12 determines that any one of the parameters in the three axial directions is smaller than +6 dB (an example of the first predetermined value) and smaller than −6 dB (an example of the second predetermined value) than remaining two parameters. Accordingly, even when the size of the earpiece 7 does not match a shape of the ear of the user, the earphones 1 can detect a situation based on the magnitude relationship among the parameters in the three axial directions, and thus can present replacement with an appropriate earpiece 7 to the user.

In addition, in the earphones 1 according to the first embodiment, the acceleration sensor 6 (an example of the sensor) acquires the frequency characteristic of the signal of each of the parameters in the three axial directions, and the level and frequency characteristic detection unit 12 (an example of the determination unit) determines whether the insertion position of the earpiece 7 in the auricle is adjusted or whether the volume level of the sweep signal is increased or decreased based on the acquisition result of the frequency characteristic of the signal of each of the parameters in the three axial directions. Accordingly, when the earphones 1 are worn, the earphones 1 can correct the audio output to an appropriate frequency characteristic and assist the improvement of the feeling of wearing of the user.

In addition, in the earphones 1 according to the first embodiment, the driver 4 (an example of the sound emitting unit) emits the sweep signal having a high frequency band (for example, 20 Hz to 2 kHz). Accordingly, the earphones 1 can more accurately determine whether the insertion position of the earpiece 7 in the auricle is adjusted or whether the volume level of the sweep signal is increased or decreased.

In addition, in the earphones 1 according to the first embodiment, the level and frequency characteristic detection unit 12 (an example of the determination unit) generates, as the determination result, the warning indicating that the volume level of the sweep signal is larger than the desired value when the level and frequency characteristic detection unit 12 determines that the difference between the frequency characteristic of the signal of any one of the parameters in the three axial directions and the frequency characteristics of the signals of the remaining two parameters is larger than +3 dB (an example of a third predetermined value) and less than +6 dB (an example of a fourth predetermined value). Accordingly, even when the volume level of the sweep signal is larger than the desired value, the earphones 1 can detect a situation based on the magnitude relationship among the frequency characteristics of the signals of the parameters in the three axial directions, and thus can correct the audio output to an appropriate frequency characteristic when the earphones 1 are worn.

In addition, in the earphones 1 according to the first embodiment, the level and frequency characteristic detection unit 12 (an example of the determination unit) generates, as the determination result, the warning indicating that the volume level of the sweep signal is smaller than the desired value when the level and frequency characteristic detection unit 12 determines that the difference between the frequency characteristic of the signal of any one of the parameters in the three axial directions and the frequency characteristics of the signals of the remaining two parameters is smaller than −3 dB (an example of a fifth predetermined value that is different from the third predetermined value but has an absolute value equal to the third predetermined value) and larger than −6 dB (an example of a sixth predetermined value that is different from the fourth predetermined value but has an absolute value equal to the fourth predetermined value). Accordingly, even when the volume level of the sweep signal is smaller than the desired value, the earphones 1 can detect a situation based on the magnitude relationship among the frequency characteristics of the signals of the parameters in the three axial directions, and thus can correct the audio output to an appropriate frequency characteristic when the earphones 1 are worn.

In addition, in the earphones 1 according to the first embodiment, the level and frequency characteristic detection unit 12 (an example of the determination unit) generates, as the determination result, the warning indicating that the insertion position of the earpiece 7 in the auricle is deviated when the level and frequency characteristic detection unit 12 determines that the difference between the frequency characteristic of the signal of any one of the parameters in the three axial directions and the frequency characteristics of the signals of the remaining two parameters is smaller than −6 dB (an example of the sixth predetermined value). Accordingly, even when the insertion position of the earpiece 7 in the auricle is deviated, the earphones 1 can detect a situation based on the magnitude relationship among the frequency characteristics of the signals of the parameters in the three axial directions, and thus can present appropriate position adjustment of the earpiece 7 to the user.

Although the embodiment is described above with reference to the drawings, it is needless to say that the present disclosure is not limited to such examples. It will be apparent to those skilled in the art that various changes, modifications, substitutions, additions, deletions, and equivalents can be conceived within the scope of the claims, and it should be understood that such changes and the like also belong to the technical scope of the present disclosure. Components in the above embodiment may be optionally combined within a range not departing from the spirit of the invention.

The present application is based on Japanese Patent Application No. 2020-202151 filed on Dec. 4, 2020, the contents of which are incorporated herein by reference.

INDUSTRIAL APPLICABILITY

The present disclosure is useful as earphones and a method of adjusting a feeling of wearing capable of assisting improvement of a feeling of wearing of a user by presenting replacement with an appropriate earpiece or position adjustment, or correcting audio output at the time of wearing to an appropriate frequency characteristic.

REFERENCE SIGNS LIST

1 earphones
2 earphone housing
3 housing
4 driver (example of sound emitting unit)
5 microphone
6 acceleration sensor (example of sensor)
7 earpiece
10 drive control circuit
11 analog-to-digital conversion unit
12 level and frequency characteristic detection unit (example of determination unit)
13 wireless communication unit (example of presentation unit)
14 volume adjustment unit
15 digital-to-analog conversion unit
16 amplifier unit
P smartphone

The invention claimed is:

1. An earphone to be worn by a user, the earphone comprising:
- a sound emitting unit that is connected to a replaceable earpiece inserted into an auricle of the user and having a plurality of sizes, and that emits a sweep signal reproduced by a terminal through the earpiece;
- a sensor that is configured to acquire, based on the sweep signal, parameters in three axial directions including an upper-lower direction, a front-rear direction, and a left-right direction of the user;
- a determination unit that is configured to determine whether a size of the earpiece is replaced or an insertion position of the earpiece in the auricle is adjusted based on an acquisition result of each of the parameters in the three axial directions; and
- a presentation unit that is configured to output a determination result of presence or absence of the replacement or the adjustment to the terminal.

2. The earphone according to claim 1, wherein
- the sound emitting unit emits the sweep signal having a low frequency band.

3. The earphone according to claim 1, wherein
- the determination unit generates, as the determination result, a warning indicating that the earpiece is pushed into a far side of the auricle when the determination unit determines that any one of the parameters in the three axial directions is larger than remaining two parameters by a first predetermined value.

4. The earphone according to claim 3, wherein
- the determination unit generates, as the determination result, a warning indicating that the earpiece is positioned on a near side in the auricle when the determination unit determines that any one of the parameters in the three axial directions is smaller than the remaining two parameters by the first predetermined value and is greater than the remaining two parameters by a second predetermined value, the second predetermined being smaller than the first predetermined value.

5. The earphone according to claim 4, wherein
- the determination unit generates, as the determination result, a warning indicating that the size of the earpiece is not suitable when the determination unit determines that any one of the parameters in the three axial directions is smaller than the remaining two parameters by the first predetermined value and is smaller than the remaining two parameters by the second predetermined value.

6. The earphone according to claim 1, wherein
- the sensor acquires a frequency characteristic of a signal of each of the parameters in the three axial directions, and
- the determination unit determines whether the insertion position of the earpiece in the auricle is adjusted or whether a volume level of the sweep signal is increased or decreased based on an acquisition result of the frequency characteristic of the signal of each of the parameters in the three axial directions.

7. The earphone according to claim 6, wherein
- the sound emitting unit emits the sweep signal having a high frequency band.

8. The earphone according to claim 6, wherein
- the determination unit generates, as the determination result, a warning indicating that the volume level of the sweep signal is larger than a desired value when the determination unit determines that a difference between the frequency characteristic of the signal of any one of the parameters in the three axial directions and frequency characteristics of signals of the remaining two parameters is larger than a third predetermined value and less than a fourth predetermined value.

9. The earphone according to claim 8, wherein the determination unit generates, as the determination result, a warning indicating that the volume level of the sweep signal is smaller than the desired value when the determination unit determines that the difference between the frequency characteristic of the signal of any one of the parameters in the three axial direction and the frequency characteristics of the signals of the remaining two parameters is smaller than a fifth predetermined value that is different from the third predetermined value but has an absolute value equal to the third predetermined value and is larger than a sixth predetermined value that is different from the fourth predetermined value but has an absolute value equal to the fourth predetermined value.

10. The earphone according to claim 9, wherein the determination unit generates, as the determination result, a warning indicating that the insertion position of the earpiece in the auricle is deviated when the determination unit determines that the difference between the frequency characteristic of the signal of any one of the parameters in the three axial directions and the frequency characteristics of the signals of the remaining two parameters is smaller than the sixth predetermined value.

11. A method of adjusting a feeling of wearing executed by an earphone to be worn by a user, the method comprising:

emitting a sweep signal reproduced by a terminal through a replaceable earpiece inserted into an auricle of the user and having a plurality of sizes;

acquiring, based on the sweep signal, parameters in three axial directions including an upper-lower direction, a front-rear direction, and a left-right direction of the user;

determining whether a size of the earpiece is replaced or an insertion position of the earpiece in the auricle is adjusted based on an acquisition result of each of the parameters in the three axial directions; and outputting a determination result of presence or absence of the replacement or the adjustment to the terminal.

* * * * *